United States Patent [19]
Osaki et al.

[11] Patent Number: 5,835,780
[45] Date of Patent: Nov. 10, 1998

[54] APPARATUS AND METHOD FOR CONTROLLING POWER SUPPLY FOR COMPUTER SYSTEM DURING SERVICE INTERRUPTION

[75] Inventors: Tomoko Osaki; Shoji Tenma, both of Kawasaki, Japan

[73] Assignee: Fujitsu Limited, Kawasaki, Japan

[21] Appl. No.: 607,612

[22] Filed: Feb. 27, 1996

[30] Foreign Application Priority Data

Mar. 2, 1995 [JP] Japan .................................. 7-042701

[51] Int. Cl.⁶ ...................................................... G06F 1/30
[52] U.S. Cl. ............................... 395/750.01; 395/750.02; 395/182.12
[58] Field of Search ............................... 395/750, 182.03, 395/182.12, 750.01, 750.06, 750.08; 364/707; 307/66; 365/228, 229, 226, 227

[56] References Cited

U.S. PATENT DOCUMENTS

| | | | |
|---|---|---|---|
| 4,232,377 | 11/1980 | Tallman et al. | 365/229 |
| 4,677,311 | 6/1987 | Morita | 307/66 |
| 4,868,832 | 9/1989 | Marrington et al. | 371/66 |
| 4,884,242 | 11/1989 | Lacy et al. | 365/229 |
| 5,051,958 | 9/1991 | Arakawa | 365/228 |
| 5,204,963 | 4/1993 | Noya et al. | 395/750 |
| 5,519,663 | 5/1996 | Harper, Jr. et al. | 365/229 |
| 5,535,399 | 7/1996 | Blitz et al. | 395/750 |
| 5,548,711 | 8/1996 | Brant et al. | 395/182.03 |
| 5,577,195 | 11/1996 | Gochi | 395/182.2 |
| 5,630,155 | 5/1997 | Karaki et al. | 395/800 |

FOREIGN PATENT DOCUMENTS

| | | |
|---|---|---|
| 54-148334 | 11/1979 | Japan . |
| 56-108119 | 8/1981 | Japan . |
| 60-45857 | 3/1985 | Japan . |
| 1-287722 | 11/1989 | Japan . |

*Primary Examiner*—Gopal C. Ray
*Attorney, Agent, or Firm*—Armstrong, Westerman, Hattori, McLeland, & Naughton

[57] ABSTRACT

Upon detection of service interruption, the power supply unit gives a notice of the occurrence of service interruption to the processor unit to instruct save operation from the memory unit to the storage device, then instructs power disconnection to the second power supply section to discontinue supply of power, and continues supply of power from the power supply section to the memory unit and the storage device for save operation. The power supply control unit gives an advance notice of power disconnection to the memory unit prior to the instruction of power disconnection to the second power supply section to start save operation from the memory unit to the storage device, and upon the lapse of a prescribed period of time from the advance notice, instructs power disconnection of the second power supply section. Upon receipt of an end notice of save operation from the memory unit, the power supply control unit instructs the first power supply section to disconnect to discontinue supply of power.

14 Claims, 10 Drawing Sheets

APPARATUS AND METHOD FOR CONTROLLING POWER SUPPLY FOR COMPUTER SYSTEM DURING SERVICE INTERRUPTION

BACKGROUND OF THE INVENTION

The present invention relates to an apparatus and a method for controlling a power supply of a computer system, which switches over the power supply to an auxiliary power supply upon service interruption to perform end operation of a processor or save operation of a memory unit. More particularly, the present invention relates to an apparatus and a method for controlling a power supply for a computer system, which conducts end processing of an operating system and save operation of memory data upon occurrence of service interruption.

There is available a conventional computer system as shown in FIG. 1, provided with a shared memory unit used by a plurality of processor units. In FIG. 1, processor units 12-1 and 12-2 are housed in respective enclosures 10-1 and 10-2, and are connected to each other through system buses 14-1 and 14-2. A shared memory unit 160 is connected to the system buses 14-1 and 14-2, and disk units 20-1 and 20-2 are connected through a disk control unit 18 as an external memory subsystem. As system power supplies, power supply control units 60-1 and 60-2, power supply sections 62-1 and 62-2, and auxiliary power supply sections 64-1 and 64-2 are provided for each of the enclosures 10-1 and 10-2. In the case of the enclosure 10-1, for example, an external AC power line 28 is connected through the auxiliary power supply section 64-1 to the power supply section 62-1, rectifies, smoothens and stabilizes the turned-on AC power supplies, and supplies DC power to units in the enclosure as typically represented by the processor unit 12-1 by means of a power supply line 66. Power is supplied also from the power supply section 62-1 to the external shared memory 160, the disk control unit 18 and the disk units 20-1 and 20-2. The auxiliary power supply section 64-1 has a built-in battery which is charged through rectifying and smoothing when AC power is normally available, and upon service interruption, backs up the power supply section 62-1 through switchover to the battery.

Upon occurrence of service interruption for such a conventional computer system, and upon detection of service interruption of the power supply sections 62-1 and 62-2, the power supply control units 60-1 and 60-2 notify the operating system (OS) of the processor units 12-1 and 12-2 of the occurrence of service interruption, and at the same time, the source of power supply is switched over to the battery built in the auxiliary power supplies 64-1 and 64-2. Upon receipt of a service interruption notice, the operating system of the processor units 12-1 and 12-2 causes forced end of the running program to cope with stoppage of power supply from the auxiliary power supply sections 64-1 and 64-2. In addition, necessary data on the shared memory unit 160, for example, minimum data necessary for restarting, are saved in the disk units 20-1 and 20-2 which function as non-volatile storage devices.

In such a power supply control apparatus for the conventional computer system, however, the volume of data saved from the shared memory unit into the disk units upon service interruption becomes larger according as the scale of the computer system becomes larger, and the processor units must confirm completion of data save simultaneously with instruction of data save. This causes increase in load of the processor units when detecting service interruption, and backup necessary upon service interruption requires much time. This leads to an increase in the battery capacity, and hence to a cost increase of the apparatus. Another problem is that a long period of time is required from recovery from service interruption until restart of system operation.

SUMMARY OF THE INVENTION

According to the present invention, there are provided an apparatus and a method for controlling a power supply for a computer system, which reduce the power supply backup time and at the same time alleviate a load on processors.

The computer system of the present invention is provided with storage devices such as processor units operated by an operating system, memory units connected to the processor units, and disk drives which store necessary contents of the memory units, hold such contents in the state of service interruption and perform reconnaissance of these contents as non-volatilized secondary storage. For the purpose of supplying power to the computer system as described above, there are provided a first power supply section which supplies power only to the memory units and the storage devices, and a second power supply section which supplies power to units other than the memory units and the storage devices. Auxiliary power supply sections back up supply of power of the first and second power supply sections during service interruption.

When detecting service interruption, the power supply control unit notifies the processor units of the occurrence of service interruption to cause the memory units to instruct save operation from the memory units to the storage devices, and then, instructs the second power supply section to disconnect power to discontinue supply of power, and supply of power to the memory units and the storage devices is continued to cause save operation through supply of power from the first power supply section backed up by the auxiliary power supply section. At this point, the power supply control unit gives an advance notice of power-off to the memory units prior to power-off instruction to the second power supply section to urge the memory units to start save operation to the storage devices, and instructs the second power supply section to disconnect power after the lapse of a prescribed period of time from the advance notice. Further, upon receipt of an end notice of save operation from the memory units, the power supply control unit instructs the first power supply section to disconnect power to discontinue supply of power. In this case also, a power-off advance notice is given to the memory units prior to power-off instruction to the first power supply section, and instructs the first power supply section to disconnect power after the lapse of a prescribed period of time from the advance notice. During save operation from the memory units to the storage devices through supply of power from the first power supply section, on the other hand, the power supply unit instructs the memory units to discontinue save operation upon receipt of a notice of auxiliary power drop from the auxiliary power supply section, and after the lapse of a prescribed period of time from the power-off instruction, instructs the first power supply section to turn off power to discontinue supply of power.

In a typical computer system to which the power supply control apparatus of the present invention is applicable, for example, a plurality of processor units are provided, and the memory unit is a shared one connected through system buses to the plurality of processor units. One or more disk units connected through disk control units to the system buses are employed as storage devices.

On the other hand, the present invention provides a method for controlling a power supply for a computer system, which comprises:

a normal power supply step of supplying power from the first power supply section to the memory units connected to the processor units in a state in which external power is normally available and to non-volatilized storage devices which hold, in the service interruption state, necessary contents of the memory units, and of supplying power from the second power supply section to units other than the memory units and the storage devices; and a service interruption processing step of, upon detection of service interruption of external power, giving a notice of occurrence of service interruption to the processor units to cause the processor units to instruct the storage devices to perform save operation to the storage devices, then instructing the second power supply section to disconnect supply of power, and continuing supply of power from the first power supply section backed up by the auxiliary power supply section to the memory units and the storage devices to cause save operation. Details of the service interruption processing step in the power supply control method of this computer system are basically the same as those in the case of the apparatus configuration.

According to the apparatus for controlling a power supply of the present invention, the power supply control unit in the computer system gives, upon detection of service interruption, a notice of the occurrence of service interruption to the shared memory units and the OS of the processor units, and upon disconnection of the second power supply section to be performed after the lapse of a certain period of time, it is made possible to continue operation of only the shared memory unit and the secondary storage section by giving an advance notice of disconnection to the shared memory unit and the OS to achieve the power-on state of only the first power supply section. The OS receiving the notice of the occurrence of service interruption instructs the shared memory unit to write the data held in the shared memory unit to save the data in the storage devices, and upon completion of write, the shared memory unit notifies the power supply control unit of the end of write. Upon receipt of this write end notice, the power supply control unit instructs the first power supply section to discontinue supply of power. When the supply capacity of the auxiliary power supply section drops to below a certain limit after the receipt of the notice of service interruption, write to the storage devices by the shared memory unit is discontinued by giving a notice of decrease in auxiliary power to the power supply control unit, and giving an advance notice of disconnection of the first power supply section to the shared memory unit. It thus suffices for processors to instruct the shared memory unit, upon service interruption, to save data, thus permitting minimization of load on the processor through alleviation of processing. Even in the case where there are present a plurality of shared memory units, the individual shared memory units perform data save to the storage devices in parallel, thus avoiding increasing the time for data save and achieving a shorter backup time required for the battery. The above and other objects, features, and advantages of the present invention will become more apparent from the following detailed description with reference to the drawings.

DETAILED DESCRIPTION OF THE PREFERRED EMBODIMENTS

Figure 1:
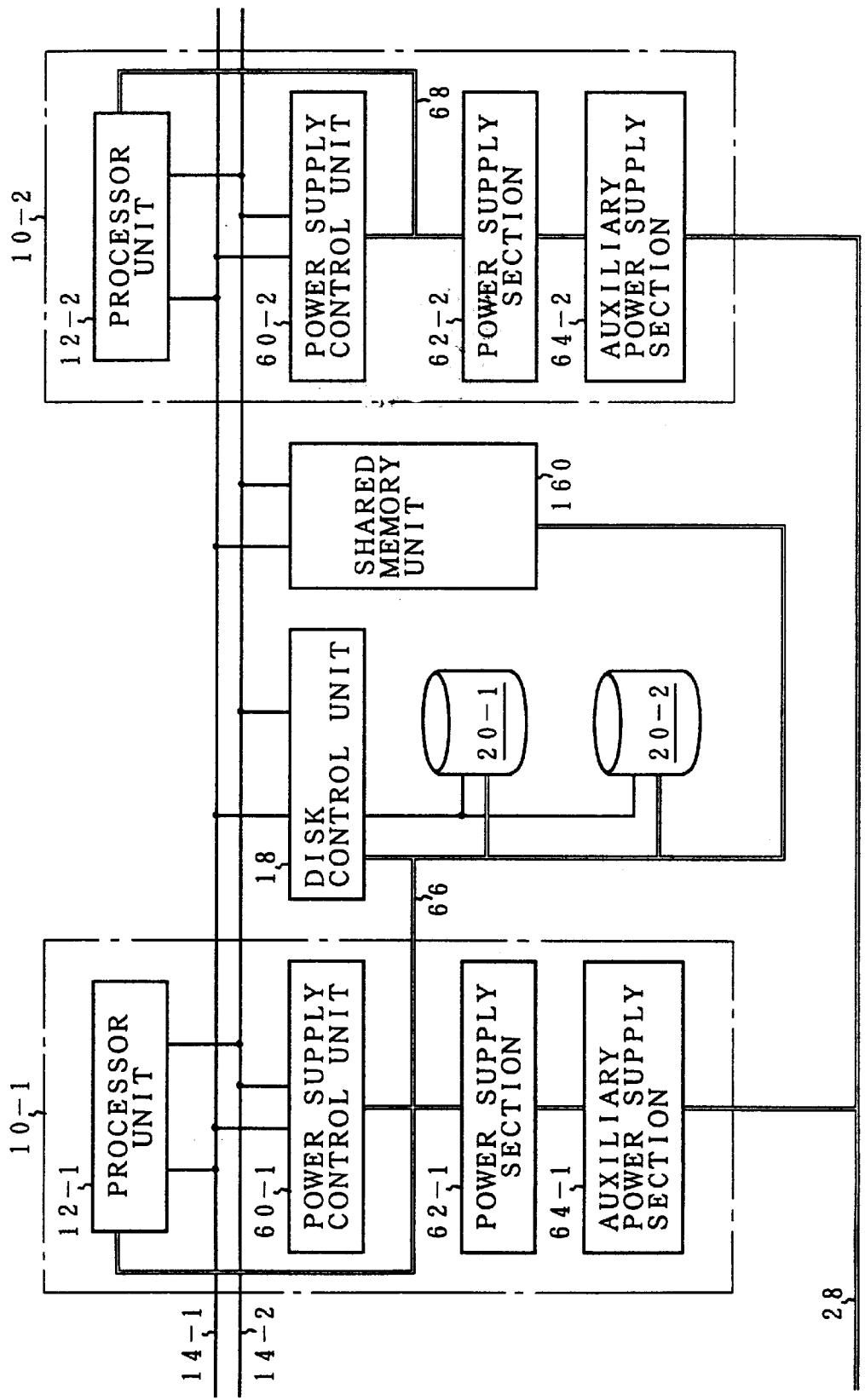
FIG. 1 is a block diagram of a conventional apparatus.
Figure 2:
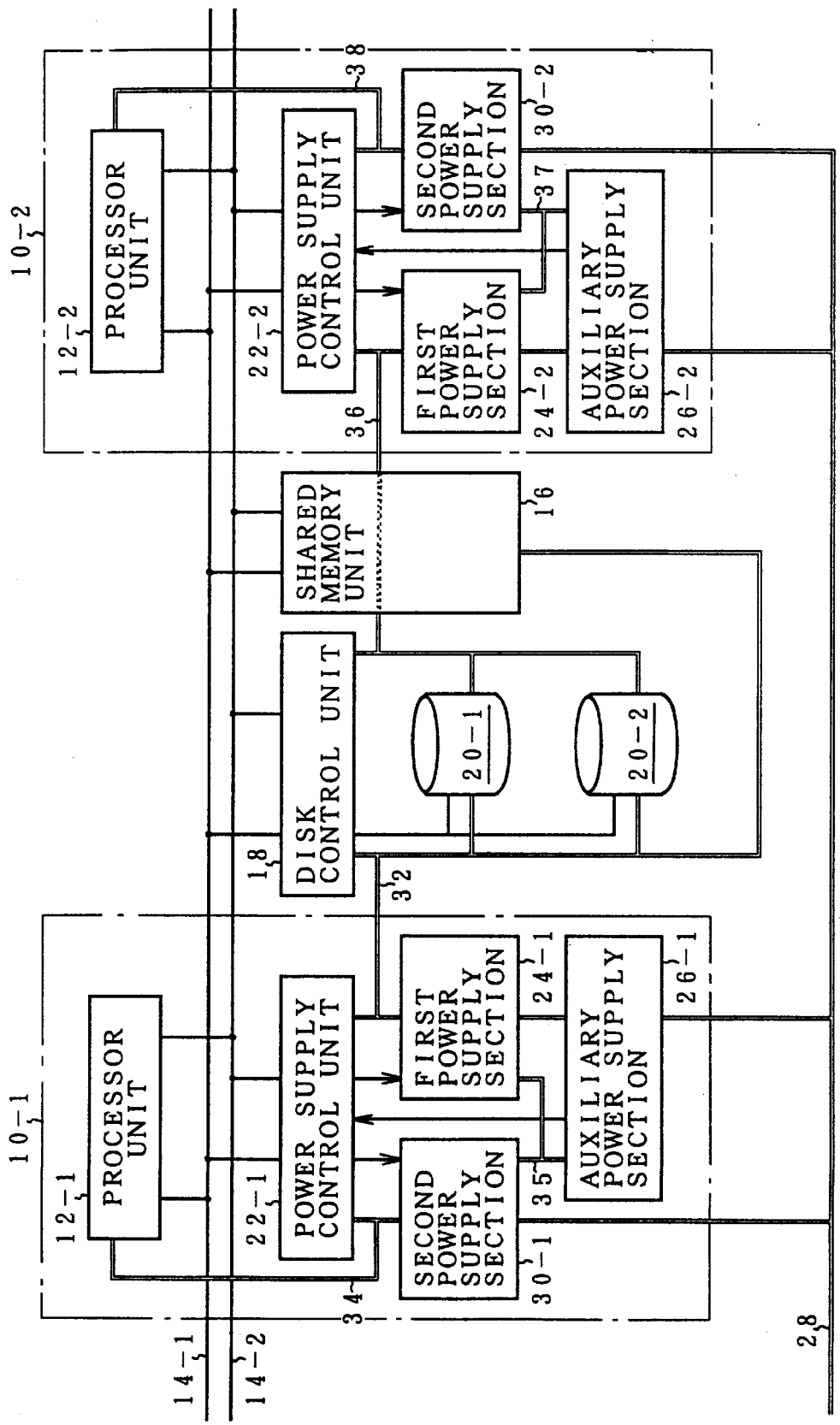
FIG. 2 is a block diagram of a computer system to which the present invention is applicable.

FIG. 2 is a block diagram of a computer system to which the power supply control apparatus of the present invention is applicable. In FIG. 2, the computer system is composed of two enclosures 10-1 and 10-2. A processor unit 12-1 is housed in the enclosure 10-1, and a processor unit 12-2 is housed in the enclosure 10-2. The processor units 12-1 and 12-2 are connected together through system buses 14-1 and 14-2. A shared memory unit 16 is connected to the system buses 14-1 and 14-2, and disk units 20-1 and 20-2 are connected thereto through a disk control unit 18. The shared memory unit 16 stores data shared by the processor units 12-1 and 12-2. The disk control unit 18 and the disk units 20-1 and 20-2 compose an external storage subsystem to the processor units 12-1 and 12-2. The external storage system composed of the disk control unit 18 and the disk units 20-1 and 20-2 constitutes a storage device (secondary storage) non-volatilized to the shared memory unit, and performs save operation of writing and holding necessary data from the shared memory unit 16 in the disk units 20-1 and 20-2 during service interruption. Power supply control units 22-1 and 22-2, first power supply sections 24-1 and 24-2, auxiliary power supply sections 26-1 and 26-2 and second power supply sections 30-1 and 30-2 are provided for the processor units 12-1 and 12-2 provided in the enclosures 10-1 and 10-2. In this embodiment, power supply lines 32 and 36 are pulled out from the first power supply sections 24-1 and 24-2 supply power to the shared memory unit 16, the disk control unit 18 and the disk units 20-1 and 20-2. The power supply lines 32 and 36 are connected from both the first power supply sections 24-1 and 24-2 of the enclosures 10-1 and 10-2 to the shared memory unit 16, the disk control unit 18 and disk units 20-1 and 20-2; power may be supplied from any one of the first power supply sections. The second power supply sections 30-1 and 30-2 supply power only to the side of the processor units 12-1 and 12-2 through power supply lines 34 and 38, i.e., the second power supply sections 30-1 and 30-2 supply power to the units other than the power supply control unit 22-1 and 22-2 and the shared memory unit 16 of the computer system, the disk control unit 18 and the disk units 20-1 and 20-2. The auxiliary power supply sections 26-1 and 26-2 have built-in batteries which are charged, when AC power is normally entered from an AC power line 28, under rectifying voltage thereof. When AC power is no more available due to service interruption, output power of the built-in batteries is supplied through the backup power supply lines 35 and 37 to the first power supply sections 24-2 and 24-2 and the second power supply sections 30-1 and 30-2.

Figure 3:
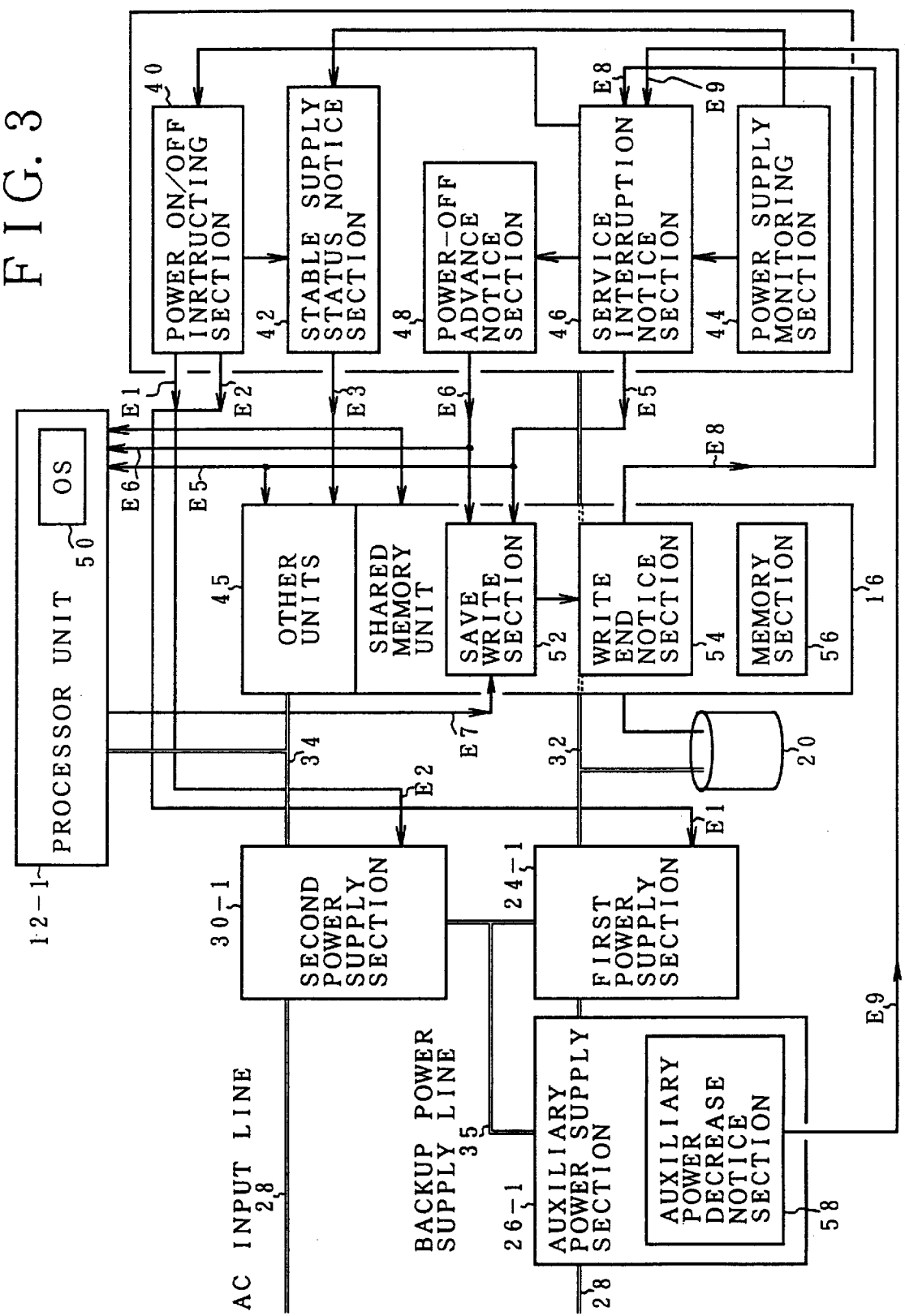
FIG. 3 is a functional diagram of individual units within an enclosure shown in FIG. 2.

FIG. 3 is a functional block diagram regarding power supply control of each unit in the enclosure 10-1, for example, shown in FIG. 2. In FIG. 3, the power supply control unit 20-1 is provided with a power on/off instructing section 40, a stable supply status notice section 42, a power supply monitoring section 44, a service interruption notice section 46 and a power-off advance notice section 48. First, the power supply monitoring section 44 monitors the state of the AC power line 28, the state of the first power supply section 24-1 and the state of the second power supply section 30-1. For the AC power line 28, more specifically, it monitors AC supply voltage to detect presence of service interruption. For the first power supply section 24-1 and the second power supply section 30-1, it detects whether or not the prescribed DC supply voltage has become in a stable supply state after power-on. When the power supply monitoring section 44 detects service interruption of AC power, a service interruption detection signal E4 is issued to the service interruption notice section 36. When DC output voltage of the first power supply section 24-1 and the second power supply section 30-1 reaches a prescribed supply voltage as a result of power-on, a detection signal showing that the prescribed voltage has been reached is issued to the stable supply status notice section 42. The power on/off instructing section 40 causes power-on and power-off of the first power supply section 24-1 by issuance of an on/off instruction signal E1. It causes power-on and power-off of the second power supply section 30-1 by means of an on/off instruction signal E2. Power-on resulting from management monitoring of the computer system is accomplished by the power on/off instructing section 40 which, upon receipt of a power-on instruction issued by operating a switch on the operating panel provided in the enclosure, issues on/off instructing signals E1 and E2 to instruct the first power supply section 24-1 and the second power supply section 30-1 to turn on power. When stopping the computer system in an ordinary operating state, on/off instructing signals E1 and E2 are issued by the power on/off instructing section 40 on the basis of a power-off instruction given by operating switches on the operating panel to the first power supply section 24-1 and the second power supply section 30-1 to cause power-off operation. In this operation, after instructing power-off by means of the on/off instructing signals E1 and E2 from the power on/off instructing section 40, the first power supply section 24-1 and the second power supply section 30-1 disconnect supply of power to the power supply lines 32 and 34 after the lapse of a predetermined period of time, 200 ms for example. After completion of the power-on operation by the first power supply section 24-1 and the second power supply section 30-1, and upon receipt of a detection signal showing that a prescribed DC supply voltage has been obtained from the power supply monitoring section 44, the stable supply status notice section 42 judges the status as showing that both the first power supply section 24-1 and the second power supply section 30-1 have reached a stable supply state of supply voltage, and issues a stable supply status notice signal E3 to the shared memory unit 16, the processor unit 12-1 and other units 45. Upon receipt of the stable supply status notice signal E3, the processor unit 10-1, the shared memory unit 16 and other units 45 individually start power-on start operation, and after execution of initialization diagnosis processing, transfer to respective operating states. Upon receipt of a service interruption detection signal E4 from the power supply monitoring section 44, the service interruption notice section 46 issues a service interruption notice signal E5 individually to the processor unit 12-1, the shared memory unit 16 and the other units 45. The processor unit 12-1 has an OS 50, and upon receipt of a service interruption notice signal E5, issues an instructing signal E7 for instructing the shared memory unit 16 to save data in the memory section 56 in the storage device 20 (save write instructing command) through interrupting operation of the OS 50. Then, the OS 50 of the processor unit 12-1 terminates the currently running program to prepare for power disconnection. A processing time necessary for the OS 50 upon occurrence of service interruption is set on the side of the power supply control unit 22-1: for example, a processing time of 15 seconds is assigned. Upon receipt of a service interruption notice from the service interruption notice section 46, the power-off advance notice section 48 issues a second power supply disconnection advance notice signal E6 to the processor unit 12-1, the shared memory unit 16, and the other units 45, after a prescribed time necessary for save operation, 15 seconds for example, of the OS of the processor unit 12-1. This second power supply disconnection advance notice signal E6 is communicated also to the power on/off instructing section 40, and after the lapse of a prescribed period of time from the disconnection advance notice, 200 ms for example, the power-on instructing section 40 instructs the second power supply section 30-1 to disconnect powder by means of an on/off instructing signal E2. Consequently, the processor unit 12-1 and other units 45 operating with power supplied from the second power supply section 30-1 through the power supply line 34 discontinue their operation at this point. What are operating at this point are only the shared memory unit 16, the storage device and the power supply control unit 22-1 receiving power from the first power supply section 24-1 through the power supply line 32. The shared memory unit 16 is provided with a save write section 52, a write end notice section 54 and a memory section 56. The save write section 52 writes data of the memory 56 into the storage device 20 on the basis of a save write instructing signal (save write instructing command) E7 issued under the effect of operation of the OS 50 based on the service interruption notice signal E5 from the power supply control unit 22-1. During this write operation, the second power supply section 30-1 is disconnected at the instruction from the power supply control unit 22-1. The write end notice section 54 monitors write of data from the memory section 56 to the storage device 20, and upon completion of write, issues a write end notice signal E8 to the service interruption notice section 46 of the power supply control unit 22-1. Upon receipt of the write end notice signal E8, the service interruption notice section 46 turns off the service interruption notice signal E5 to the shared memory unit 16, thereby giving an advance notice of disconnection of the first power supply section 24-1. At the same time, the service interruption notice section 46 notifies the power on/off instructing section 40 of the receipt of the write end signal E8, after the lapse of a prescribed period of time, 200 ms for example, the power on/off instructing section 40 issues an on/off instructing signal E1 to the first power supply section 24-1 to instruct power disconnection, thereby discontinuing supply of power to the shared memory unit 16, the storage device 20 and the power supply control unit 22-1.

An auxiliary power decrease notice section 58 is provided in the auxiliary power supply section 26-1. The auxiliary power decrease notice section 58 monitors the power supply capacity of the built-in battery, and when the power supply capacity decreases to below a prescribed value, issues an auxiliary power decrease notice signal E9 to the service interruption notice section 46 of the power supply control unit 22-1. When receiving an auxiliary power decrease notice signal E9 prior to issuance of a write end signal E8 from the shared memory unit 16, the service interruption notice section 46 turns off the service interruption signal E5 to the shared memory unit 16, and gives an advance notice of disconnection of the first power supply section 24-1. After the lapse of 200 ms, the power on/off instructing section 40 issues an on/off instructing signal E1 to disconnect power to the first power supply section 24-1. Upon receipt of an advance notice of disconnection of the first power supply section 24-1 as a result of turning off of the service interruption signal E5 based on the auxiliary power decrease notice signal E9, the save write section 52 of the shared memory unit 16 forcedly discontinues save write operation in execution, and holds only data already written into the storage device as valid to prepare for power disconnection after the lapse of 200 ms.

Figure 4:
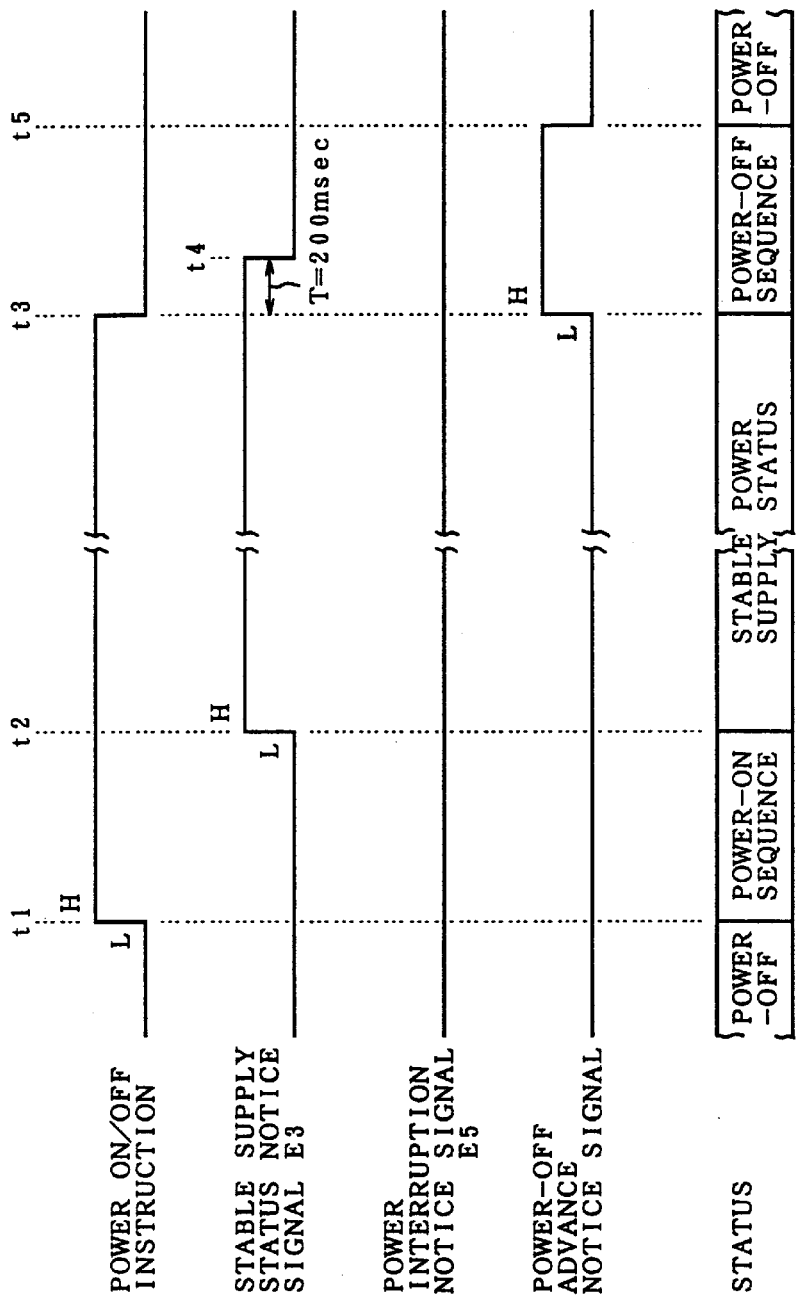
FIGS. 4A to 4E are timing charts of power-on and power-off in normal operation.

FIGS. 4A to 4E are timing charts covering the steps from power-on to power-off in ordinary operation using the power supply control unit 22-1 shown in FIG. 3. Power-on and power-off are accomplished as shown in FIG. 4A: power-on is instructed at timing t1 and power disconnection is instructed at timing t3. By instructing power-on at timing t1, a power-on instruction is given to the first power supply section 24-1 and the second power supply section 30-1 by means of on/off instructing signals E1 and E2 from the power supply control unit 22-1, and a power-on sequence as shown in FIG. 4E is executed. When the supply voltage to the power supply lines 32 and 34 reaches a prescribed voltage while this power-on sequence is executed, the stable supply status notice signal E3 shown in FIG. 4B reaches the H-level at timing t2, and power-on is started for the processor unit 12-1, the shared memory unit 16, and the other units 45, thus the system transferring to operating state after initialization diagnosis. When power-off is instructed at timing t3 in the operating state of the computer system, the power-off advance notice signal E6 shown in FIG. 4D reaches the H-level. Upon receipt of this power-off advance notice signal E6, an end processing to prepare for power disconnection as shown in FIG. 4E is executed as a power-off sequence individually for the processor unit 12-1, the shared memory unit 16, and the other units 45. At timing T4 when a prescribed time T, for example T=200 ms, has elapsed from the power-off advance notice at timing t3, the stable supply status notice signal E3 as shown in FIG. 4B reaches the L-level, and power disconnection is actually started at this point. Finally at timing t5, the power-off sequence started at timing t3 comes to an end, and the system transfers to the power-off state.

Figure 5:
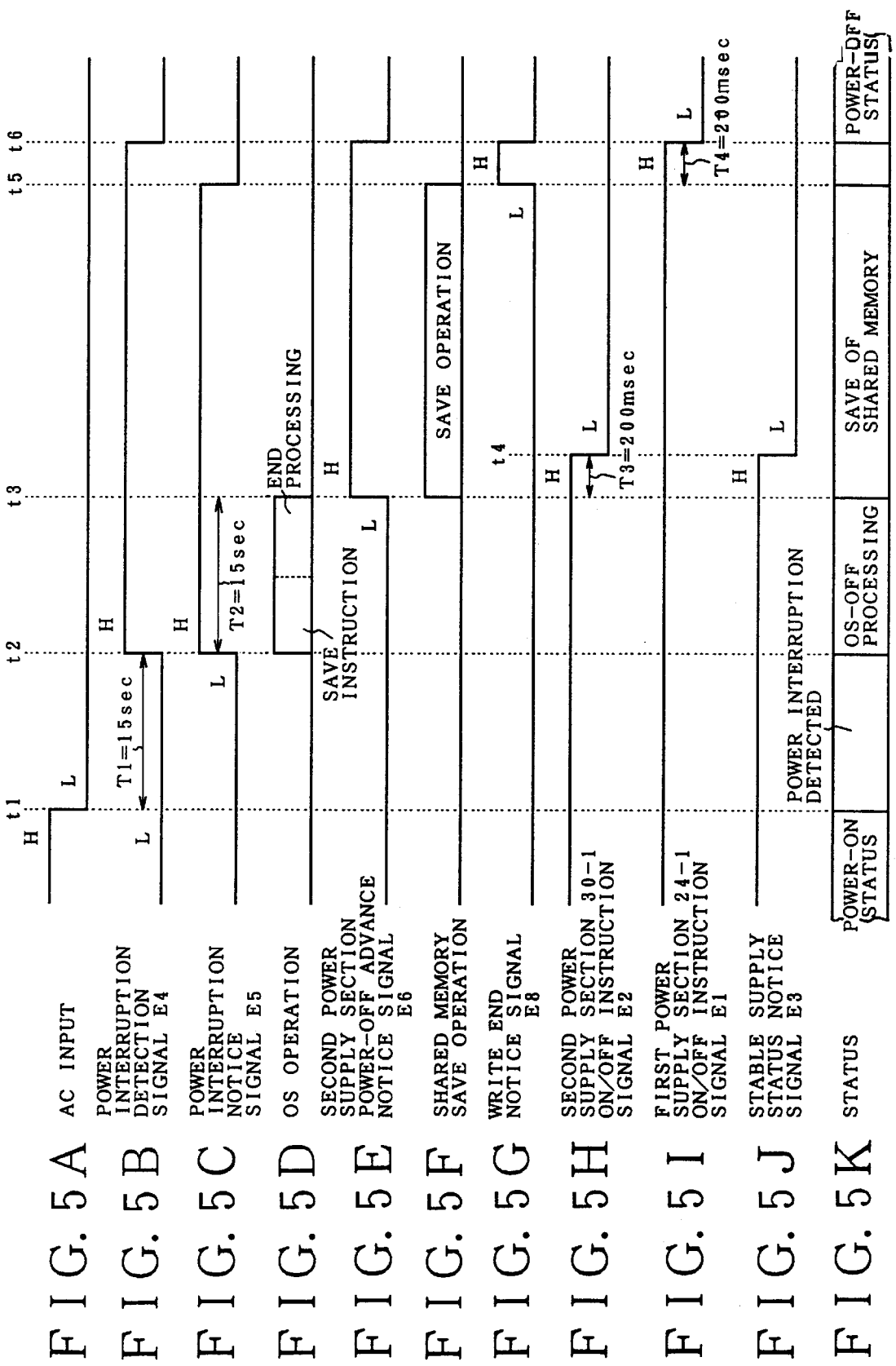
FIGS. 5A to 5K are timing charts of operations during service interruption.

FIGS. 5A to 5K are timing charts during service interruption in the embodiment shown in FIG. 3. Assume here as in FIG. 5A that service interruption occurs at timing t1 to disconnect AC power input. This service interruption is detected by the power supply monitoring section 44 of the power supply control unit 22-1, and if service interruption continues from timing t1 of the occurrence of service interruption for a set period of time T1, which is for example T1=15 seconds, the service interruption detection signal E4 rises up to H-level at timing t2. Upon receipt of this service interruption detection signal E4, the service interruption notice section 46 brings the service interruption notice signal E5 shown in FIG. 5C to H-level and gives a notice of service interruption to the processor unit 12-1, the shared memory unit 16 and the other units 45. As shown in FIG. 5D, the SO of the processor unit 12-1 causes start of save write operation of data into the storage device 20 by issuing the save write instructing signal E7 (save write instructing command) to the shared memory unit 16, on the basis of the service interruption notice at timing t2. Then, the OS 50 forcedly terminates the program in running to prepare for power disconnection. At timing t3 after the lapse of a set period of time T2, which is T2=15 seconds for example, from the service interruption notice at timing t2, the second power supply section disconnection advance notice signal E6 rises up to H-level from the power-off advance notice section 48 as shown in FIG. 5E, thereby notifying the processor unit 12-1, the shared memory unit 16 and the other units 45 of the advance notice of disconnection of the second power supply section 30-1. Upon the lapse of a set period of time T3, which is T3=200 ms for example, from the advance notice of disconnection at timing t3, the on/off instructing signal E2 to the second power supply section 30-1 decreases down to L-level as shown in FIG. 5H, thereby instructing power disconnection of the second power supply section 30-1. As a result, supply of supply voltage from the second power supply section 30-1 to the power supply line 34 is discontinued. The stable supply status notice section 42 recognizes disconnection of the second power supply section 30-1 and brings the stable supply status notice signal E3 from H-level to L-level at timing t4 as shown in FIG. 5J. The save write section 52 of the shared memory unit 16 has received the save write instructing signal E7 from the OS 50 at timing t2, and save operation in this embodiment is started at the timing when the disconnection advance notice signal E6 of the second power supply section 30-1 at timing t3 rises up to H-level. When save write operation of data from the shared memory unit 16 to the storage device 20 comes to an end at timing t5, the write end signal E8 from the write notice section 54 rises up from L-level to H-level as shown in FIG. 5G, thereby giving a write end notice. Upon receipt of this write end notice, the service interruption notice section 46 brings the service interruption notice signal E5 so far kept at H-level to L-level as shown in FIG. 5C, and by the decrease of the service interruption notice signal E5 to L-level, the shared memory unit 16 recognizes the advance notice of disconnection of the first power supply section 24-1. At timing t6 upon the lapse of a prescribed period of time T4, which is T4=200 ms for example, from the advance notice of disconnection of the first power supply section 24-1 at timing t5, the on/off instructing signal E1 to the first power supply section 24-1 decreases from H-level to L-level as shown in FIG. 5I, indicating power disconnection, and the whole units become in the state of discontinued power supply.

Observation of the supply of backup power from the auxiliary power supply section 26-1 during service interruption reveals that, upon service interruption discontinuing AC power input at timing t1 in FIG. 5A, supply of power to the first power supply section 24-1 and the second power supply section 30-1 is switched over to power input from a battery built in the auxiliary power supply section 26-1, and operation of all the units is ensured by the supply of backup power from the auxiliary power supply section 26-1. At timing t4 in this state, power to the second power supply section 30-1 is discontinued, and supply of backup power from the auxiliary power supply section 26-1 to the processor unit 12-1 and the other units 45 is discontinued, thereby limiting the supply of backup power to the power supply control unit 22-1, the shared memory unit 16 and the storage device 20. Subsequently to timing t4, therefore, power consumption of the auxiliary power supply section 26-1 is largely inhibited.

Figure 6:
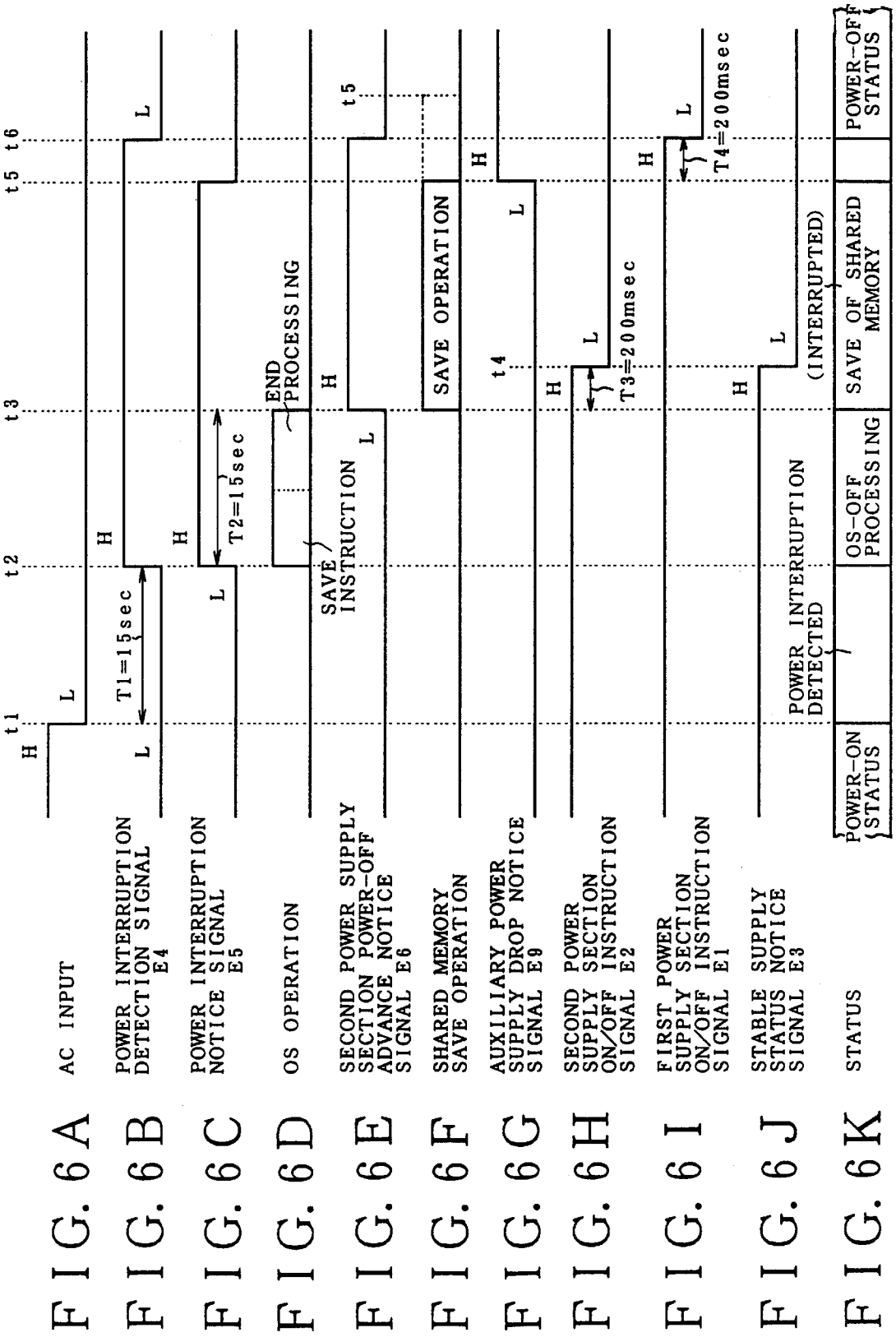
FIGS. 6A to 6K are timing charts upon occurrence of auxiliary power decrease during save in service interruption.

FIGS. 6A to 6K are timing charts for the case where supply of power from the auxiliary power supply section 26-1 is discontinued during save write operation of data from the shared memory unit 16 to the storage device 20. Steps from service interruption timing t1 to the start of save write operation at timing t3 and further up to power disconnection of the second power supply section 30-1 at timing t4 in FIGS. 6A to 6F and 6H to 6K are the same as in FIGS. 5A to 5K. During save write of data from the shared memory unit 16 to the storage device 20 started at timing t3, the capacity of the battery provided in the auxiliary power supply section 26-1 decreases, and upon decrease in power supply capacity to below a prescribed value, the auxiliary power decrease notice signal E9 from the auxiliary power decrease notice section 59 rises up from L-level to H-level at timing t5 as shown in FIG. 6G, thereby notifying the service interruption notice section 46 of the power supply control unit 22-1 of the capacity decrease of auxiliary power. Upon receipt of this auxiliary power decrease notice signal E9, the service interruption notice section 46 brings the service interruption notice signal to the shared memory unit 16 shown in FIG. 6C from H-level so far kept down to L-level to give an advance notice of disconnection of the first power supply section 24-1. The save write section 50 of the shared memory unit 16 causes, when recognizing an advance notice of disconnection of the first power supply section 24-1, which brings the service interruption notice signal E5 from the power supply control unit 22-1 to L-level, forced end of write operation to the storage device 20 to prepare for power disconnection. At timing t6 upon the lapse of a prescribed period of time T4=200 ms from timing t5 of the advance notice of disconnection as represented by the decrease of the service interruption notice signal E5 to the shared memory unit 16 to L-level, the power on/off instructing section 40 of the power supply control unit 22-1 causes the on/off instructing signal E1 shown in FIG. 6I to instruct disconnection by decreasing from H-level to L-level, thereby conduct disconnection of supply of power by the first power supply section 24-1. Under the effect of forced termination effected by the detection of a decrease in the power supply capacity of the auxiliary power supply section 26-1 in the middle of save write, data written so far are normally held even in the middle of write into the storage device 20, and it is possible to avoid an error termination of save write due to abnormal termination by sudden power disconnection, and retain data applicable for restarting after recovery of AC power input as far as possible.

Figure 7:
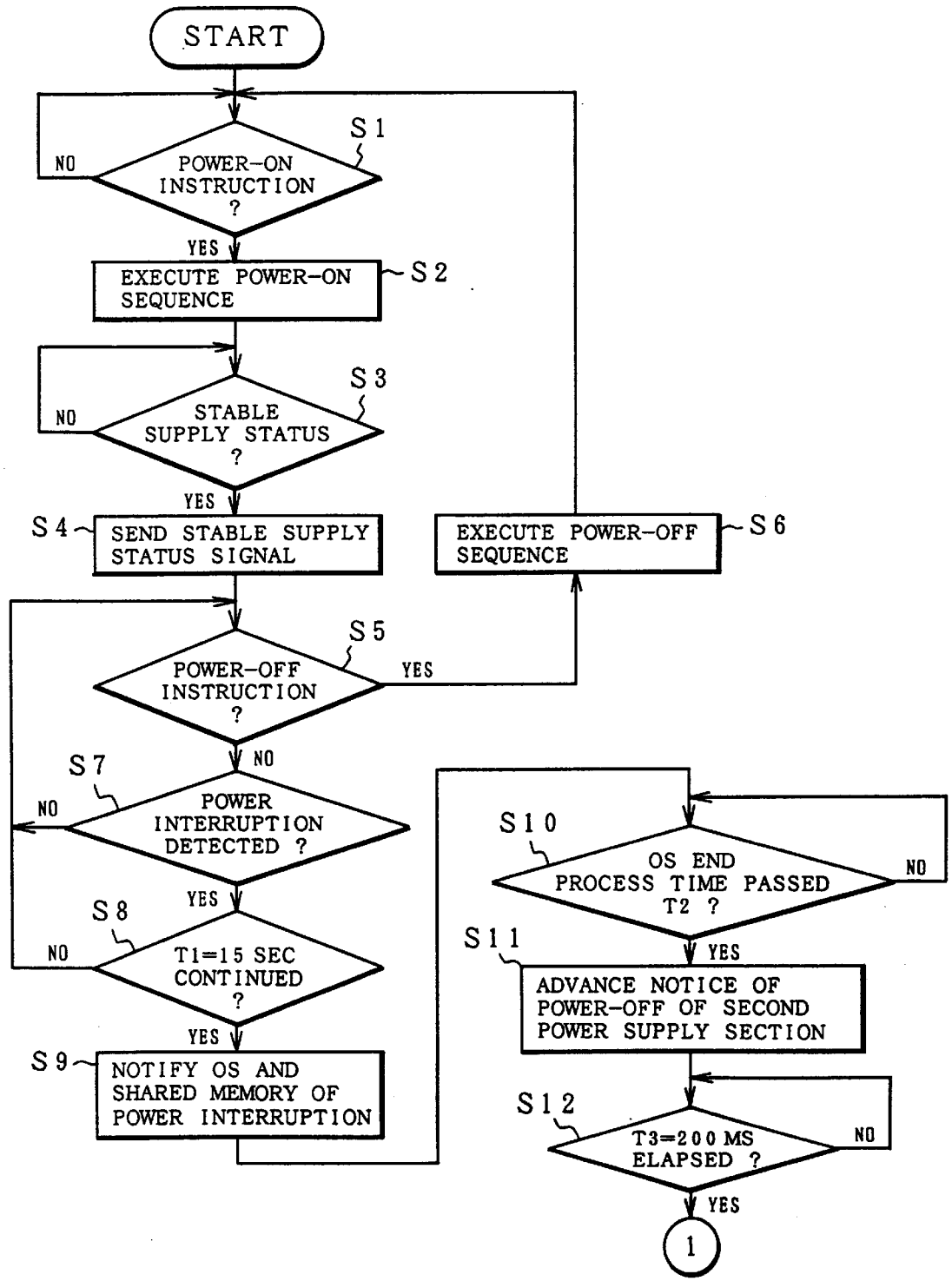
FIG. 7 is a time chart of processing operations of the power supply control unit shown in FIG. 3.
Figure 8:
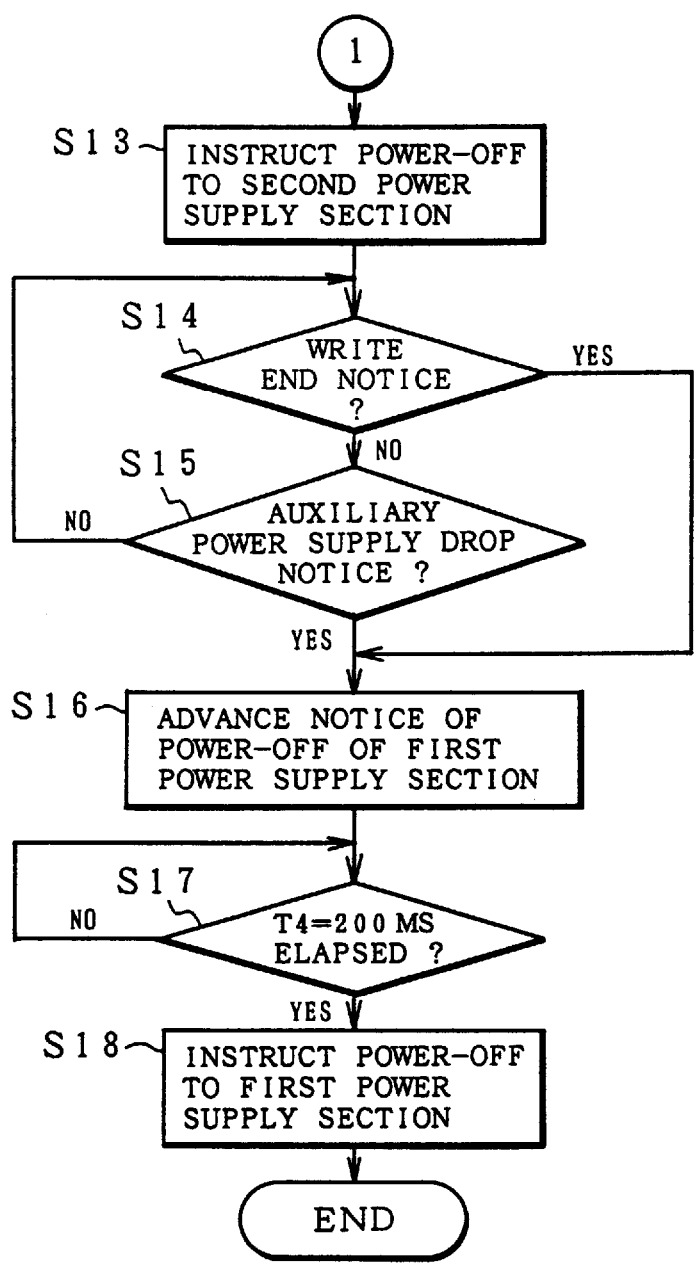
FIG. 8 is a time chart following that of the processing operations shown in FIG. 7.

FIG. 7 is a flowchart illustrating processing operation of the power supply control unit 22-1 shown in FIG. 3. First, upon power-on instruction at step S1, the power-on sequence is executed at step S2, and it is checked whether or not the supply is in a stable state at step S3. When a stable state is achieved, a stable supply status signal E3 is issued at step S4. Then at step S5, presence of a power-off instruction is checked, and is present, the power-off sequence is executed at step S6. If not, presence of detection of service interruption is checked at step S7. If detection of service interruption is present, it is checked whether or not detection of service interruption has continued for T=15 seconds, and if service interruption is judged to have continued for 15 seconds, occurrence of service interruption is notified in the form of issuance of a service interruption notice signal E5 to the OS of the processor unit 12-1, the shared memory unit 16, and the other units 45 at step S9. Then at step S10, it is checked whether or not the end processing time of T2=15 seconds of the OS 50 for service interruption has elapsed, and upon lapse of the period of time T2, a power-off advance notice signal E6 is issued at step S11, thereby giving an advance notice of disconnection of the second power supply section 30-1 to the processor unit 12-1, the shared memory unit 16 and the other units 45. Then at step S12, after the lapse of T3=200 ms, the process proceeds to step S13 as shown in FIG. 8, instructing disconnection to the second power supply section 30-1. In this state, in the shared memory unit 16, save write operation is underway to the storage device 20, and at step S14, presence of a write end notice is checked. If present, presence of an auxiliary power decrease notice is checked at step S15. If the write end notice is recognized at step S14, an advance notice of disconnection of the first power supply section 24-1 is given by reducing the service interruption notice signal E5 to the shared memory unit 16 to L-level, and at step S17, lapse of T4=200 ms is waited for. At step S18, disconnection is instructed to the first power supply section 24-1. On the other hand, if the auxiliary power decrease notice is recognized at step S15 prior to obtaining the write end notice at step S14, an advance notice of disconnection of the first power supply section 24-1 is similarly given at step S14, and then, after waiting for the lapse of T4=200 ms at step S17, disconnection is instructed to the first power supply section 24-1 at step S18.

Figure 9:
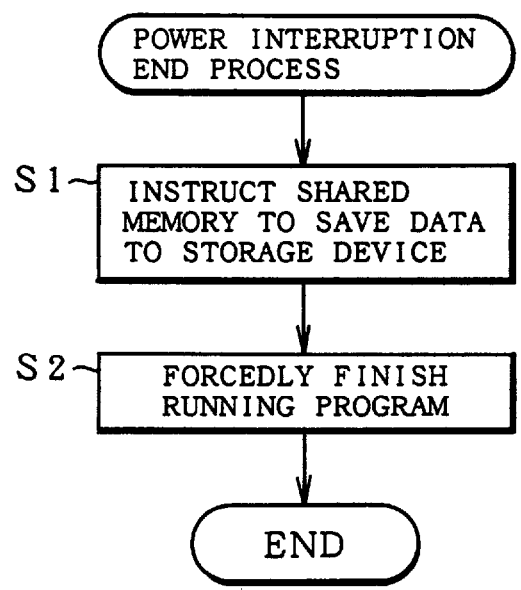
FIG. 9 is a flowchart of processing operations of the processor unit shown in FIG. 3.

The flowchart shown in FIG. 9 illustrates the service interruption termination process of the OS 50 provided in the processor unit 12-1 shown in FIG. 3. Upon receipt of the service interruption notice signal E5 from the power supply control unit 22-1, the OS 50 starts service interruption termination process as shown in FIG. 9 through interruption. This service interruption termination processing comprises instructing save write of data from the shared memory unit 16 to the storage device 20 at step S1, and forcedly terminating the currently running program at the next step S2.

Figure 10:
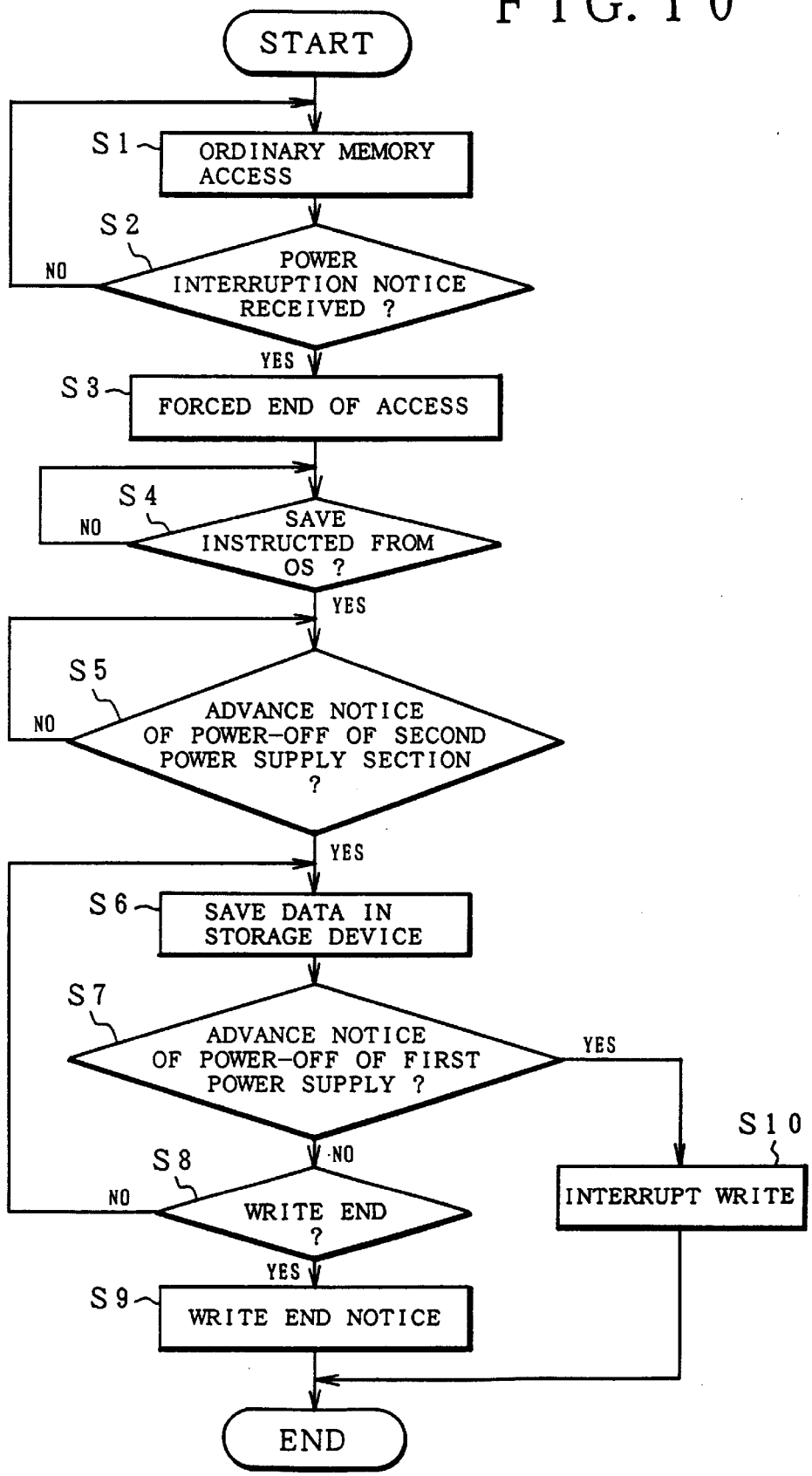
FIG. 10 is a flowchart of processing operations of the shared memory unit shown in FIG. 3.

The flowchart shown in FIG. 10 is the processing operation of the shared memory unit 16 shown in FIG. 3. In a usual operating state in which the power supply stable status notice signal E3 is on H-level, ordinary memory access based on an input/output request from the processor unit 12-1 or a processor unit of other enclosure is executed at step S1. At step S2 in this state, upon recognition of the service interruption notice from the power supply control unit 22-1, access currently underway is forcedly terminated at step S3, and the save write instruction from the OS 50 of the processor unit 12-1 is waited for at step S4. Upon receipt of the save write instruction from the OS 50, the advance notice of disconnection of the second power supply section 30-1 from the power supply control unit 22-2 is waited for at step S5. Upon recognition of the advance notice of disconnection, save write of data to the storage device 20 is executed at step S6. During save write of data, presence of an advance notice of disconnection of the first power supply section 24-1 from the power supply control unit 22-1 is checked at step S7. If an advance notice of disconnection of the first power supply section 24-1 is not present, it is checked at step S8 whether or not write has been completed, and upon completion of write, the write end notice signal is issued to the power supply control unit 22-1 at step S9 to complete processing. At step S7, on the other hand, if an advance notice of disconnection of the first power supply section is received as a result of a decrease in the power supply capacity of the auxiliary power supply 26-1 during save write, interruption processing is executed at step S10 to prepare for disconnection of power.

While the description of FIGS. 2 to 5 has covered the enclosure 10-1 side in FIG. 2, the enclosure 10-2 side is quite the same. The above-mentioned embodiment has covered a computer system provided with two processor units 12-1 and 12-2 and a shared memory unit 16, whereas the system may be provided with three or more processor units, or two or more shared memory units. The service interruption time T1 for the detection of service interruption, the time T2 for save processing resulting from OS service interruption, and the times T3 and T4 from the advance notice of power disconnection to the instruction of disconnection are not limited to the values presented for the embodiment, and appropriate values may be set as required.

In the present invention, as described above, it is possible to reduce the power consumption of the backup power supply based on a battery upon service interruption and minimize the battery capacity for ensuring a necessary backup time by separately providing a power supply section for the shared memory unit and the storage device thereof from a power supply for the other units including the processor unit, disconnecting the supply of power to the processor unit and other units from the power supply section at a point when, upon occurrence of service interruption, instruction of save operation to the shared memory unit and end of its own program by the OS of the processor unit have been completed, thereby using only supply of power to the shared memory unit and the storage device. When the battery capacity is unchanged, in contrast, it is possible to sufficiently extend the time required for backup.

Upon occurrence of service interruption, it suffices for the processor unit to give an instruction of save write to the shared memory unit and terminate its own currently running program. Because of the subsequent release from save write of data from the shared memory to the storage device, it is possible to largely reduce the load on the processor unit, and promptly transfer the processor unit into a state permitting power disconnection.

Furthermore, at the stage of power disconnection as a result of service interruption, supply of power to the processor unit and other units is promptly discontinued, and only supply of power to the shared memory unit and the storage device is supplemented by supply of power by a battery, thus permitting prevention of an unnecessary power consumption and ensuring save write of data from the shared memory unit to the storage device, hence making it possible to promptly restart the computer system upon recovery from service interruption by the use of saved data of the storage device.

What is claimed is:

1. A power supply control apparatus of a computer system, comprising:

a processor unit operating by an operating system;

a memory unit connected to said processor unit;

a non-volatile storage device which stores necessary contents of said memory unit, and retains said contents during a service interruption;

a first power supply section which supplies a first power supply only to said memory unit and said storage device;

a second power supply section which supplies a second power supply to components of the computer system other than said memory unit and said storage device;

an auxiliary power supply section which supplies power to back up said first and said second power supply sections during the service interruption; and a power supply control unit which, after giving a notice of the service interruption to said processor unit upon detection of the service interruption to instruct the processor unit to perform a save operation saving the contents from said memory unit to said storage device, instructs said second power supply section to disconnect said second power supply, and continues said first power supply to said memory unit and said storage device through said first power supply section backed up by said auxiliary power supply section to allow performance of the save operation, wherein upon receipt of an end notice of the save operation from said memory unit, said power supply control unit instructs said first power supply section to disconnect said first power supply.

2. An apparatus according to claim 1, wherein, prior to instructing said second power supply section to disconnect said second power supply, said power supply control unit gives an advance notice of power disconnection to said memory unit to cause said memory unit to start the save operation to said storage device, and after a predetermined period of time from said advance notice, instructs said second power supply section to disconnect said second power supply.

3. An apparatus according to claim 1, wherein, prior to instructing said first power supply section to disconnect said first power supply, said power supply control unit gives an advance notice of disconnection to said memory unit, and after a predetermined period of time from said advance notice, instructs said first power supply section to disconnect said first power supply.

4. A power supply control apparatus of a computer system, comprising:

a processor unit operating by an operating system;

a memory unit connected to said processor unit;

a non-volatile storage device which stores necessary contents of said memory unit, and retains said contents during a service interruption;

a first power supply section which supplies a first power supply only to said memory unit and said storage device;

a second power supply section which supplies a second power supply to components of the computer system other than said memory unit and said storage device;

an auxiliary power supply section which supplies power to back up said first and said second power supply sections during the service interruption; and a power supply control unit which, after giving a notice of the service interruption to said processor unit upon detection of the service interruption to instruct the processor unit to perform a save operation saving the contents from said memory unit to said storage device, instructs said second power supply section to disconnect said second power supply, and continues said first power supply to said memory unit and said storage device through said first power supply section backed up by said auxiliary power supply section to allow performance of the save operation, wherein, upon receipt of an auxiliary power supply decrease notice from said auxiliary power section during the save operation, said power supply control unit instructs interruption of the save operation to said memory unit, and after a predetermined period of time from said instruction of interruption, instructs said first power supply section to discontinue said first power supply.

5. An apparatus according to claim 4, wherein, prior to instructing said second power supply section to disconnect said second power supply, said power supply control unit gives an advance notice of power disconnection to said memory unit to cause said memory unit to start the save operation to said storage device, and after a predetermined period of lime from said advance notice, instructs said second power supply section to disconnect said second power supply.

6. An apparatus according to claim 4, wherein, upon receipt of an end notice of the save operation from said memory unit, said power supply control unit instructs said first power supply section to disconnect said first power supply.

7. An apparatus according to claim 4, wherein, prior to instructing said first power supply section to disconnect said first power supply, said power supply control unit gives an advance notice of disconnection to said memory unit, and after a predetermined period of time from said advance notice, instructs said first power supply section to disconnect said first power supply.

8. A method for controlling power supply for a computer system, comprising:

- a normal power supply step of supplying a first power supply from a first power supply section to a memory unit connected to a processor unit in a state in which external power is normally available and to a nonvolatile storage device which holds in the service interruption state, necessary contents of said memory unit, and of supplying a second power supply from a second power supply section to components of the computer system other than said memory unit and said storage device; and

- a service interruption processing step of, upon detection of a service interruption of external power, giving a notice of occurrence of the service interruption to said processor unit to cause said processor unit to instruct said memory unit to perform a save operation to said storage device, then instructing said second power supply section to disconnect said second power supply, and continuing said first power supply from said first power supply section backed up by said auxiliary power supply section to said memory unit and said storage device to allow performance of the save operation,

- wherein upon receipt of an end notice of the save operation from said memory unit, said service interruption processing step instructs said first power supply section to discontinue said first power supply.

9. A method according to claim 8, wherein, prior to instructing said second power supply section to disconnect said second power supply, said service interruption processing step gives an advance notice of disconnection to said memory unit to start the save operation to said storage device, and after a predetermined period of time from said advance notice, instructs said second power supply section to disconnect said second power supply.

10. A method according to claim 8, wherein, prior to instructing said first power supply section to disconnect said first power supply, said service interruption processing step gives an advance notice of power disconnection to said memory unit, and after a predetermined period of time from said advance notice, instructs said first power supply section to disconnect said first power supply.

11. A method for controlling power supply for a computer system, comprising:

- a normal power supply step of supplying a first power supply from a first power supply section to a memory unit connected to a processor unit in a state in which external power is normally available and to a nonvolatile storage device which holds, in the service interruption state, necessary contents of said memory unit, and of supplying a second power supply from a second power supply section to components of the computer system other than said memory unit and said storage device; and

- a service interruption processing step of, upon detection of a service interruption of external power, giving a notice of occurrence of the service interruption to said processor unit to cause said processor unit to instruct said memory unit to perform a save operation to said storage device, then instructing said second power supply section to disconnect said second power supply, and continuing said first power supply from said first power supply section backed up by said auxiliary power supply section to said memory unit and said storage device to allow performance of the save operation,

- wherein, upon receipt of an auxiliary power decrease notice from said auxiliary power supply section during the save operation, said service interruption processing step instructs said memory unit to interrupt the save operation, and after a predetermined period of time from said interruption instruction, instructs said first power supply section to disconnect said first power supply.

12. A method according to claim 11, wherein, prior to instructing said second power supply section to disconnect said second power supply, said service interruption processing step gives an advance notice of disconnection to said memory unit to start the save operation to said storage device, and after a predetermined period of time from said advance notice, instructs said second power supply section to disconnect said second power supply.

13. A method according to claim 11, wherein, upon receipt of an end notice of the save operation from said memory unit, said service interruption processing step instructs said first power supply section to discontinue said first power supply.

14. A method according to claim 11, wherein, prior to instructing said first power supply section to disconnect said first power supply, said service interruption processing step gives an advance notice of power disconnection to said memory unit, and after a predetermined period of time from said advance notice, instructs said first power supply section to disconnect said first power supply.

* * * * *